(12) United States Patent
Wiley

(10) Patent No.: US 10,486,755 B2
(45) Date of Patent: Nov. 26, 2019

(54) SELF-BALANCING ROBOTIC MOTORCYCLE

(71) Applicant: Facebook, Inc., Menlo Park, CA (US)

(72) Inventor: Scott C. Wiley, Los Altos, CA (US)

(73) Assignee: Facebook, Inc., Menlo Park, CA (US)

( * ) Notice: Subject to any disclaimer, the term of this patent is extended or adjusted under 35 U.S.C. 154(b) by 89 days.

(21) Appl. No.: 15/828,387

(22) Filed: Nov. 30, 2017

(65) Prior Publication Data

US 2019/0161132 A1  May 30, 2019

(51) Int. Cl.
| | |
|---|---|
| *B62D 37/06* | (2006.01) |
| *G05B 19/05* | (2006.01) |
| *B60W 10/20* | (2006.01) |
| *B60W 10/12* | (2012.01) |
| *B60W 30/02* | (2012.01) |
| *B62D 61/02* | (2006.01) |
| *B25J 5/00* | (2006.01) |

(52) U.S. Cl.
CPC ............. *B62D 37/06* (2013.01); *B60W 10/12* (2013.01); *B60W 10/20* (2013.01); *B60W 30/02* (2013.01); *B62D 61/02* (2013.01); *G05B 19/058* (2013.01); *B25J 5/007* (2013.01); *B60L 2200/00* (2013.01); *B60L 2240/20* (2013.01); *B60L 2260/34* (2013.01); *B60W 2300/36* (2013.01); *B60W 2520/28* (2013.01); *B60W 2710/12* (2013.01); *B60W 2710/20* (2013.01); *B60W 2710/22* (2013.01)

(58) Field of Classification Search
CPC ....... B62D 37/06; B60W 10/12; B60W 10/20; B60W 30/02; B60W 2300/36; B60W 2520/28; B60W 2710/12; B60W 2710/20; B60W 2710/22; G05B 19/058; B25J 5/007; B60L 2240/20; B60L 2260/34; B60L 2200/00
See application file for complete search history.

(56) References Cited

U.S. PATENT DOCUMENTS

2017/0043831 A1\*  2/2017  Zhu .......................... B62H 7/00

\* cited by examiner

*Primary Examiner* — Aaron L Troost
(74) *Attorney, Agent, or Firm* — FisherBroyles, LLP

(57) ABSTRACT

A robotic motorcycle may include a chassis, driven wheel assemblies, and a control loop stabilizer. The driven wheel assemblies may each include a wheel and a bevel gear. The wheel may be mounted to an axle for rotation about a drive axis and steering about a substantially vertical steering axis. A steer shaft may connect the axle to a steer assembly that controls rotation of the steer shaft about the steering axis to steer the wheel. A drive shaft may be coupled to a drive assembly that controls rotation of the drive shaft about the steering axis. The bevel gear may couple the other end of the drive shaft to the axle so that rotation of the drive shaft about the steering axis controls rotation of the wheel about the drive axis. The control loop stabilizer may determine parameters for the drive and steer assemblies to balance the motorcycle.

20 Claims, 7 Drawing Sheets

SELF-BALANCING ROBOTIC MOTORCYCLE

BACKGROUND

Motorcycles and other two-wheeled vehicles typically employ one or more powered or driven wheels to facilitate rolling or otherwise linear movement in a generally horizontal direction. A power assembly (such as an electric motor or a combustion engine) typically controls (via, e.g., a drivetrain) rotation of a motorcycle wheel's axle, which may in turn control rotation of the wheel thereabout. Traditionally, at least a portion of a motorcycle's power assembly (e.g., the chain or belt that connects the wheel's axle to a combustion engine or electric motor, the motor itself, etc.), as well as its brake assembly, are disposed within the circumference of at least one of the motorcycle's wheels, near the wheel's hub, and adjacent to the wheel's axle.

The placement of a power or brake assembly within the circumference of a wheel, however, can lead to various disadvantages. For example, when a component of a power or brake assembly (e.g., the chain or belt that connects the wheel's axle to a combustion engine or electric motor, the motor itself, brake pads, brake cabling, etc.) is disposed within the circumference of the wheel, this component may be exposed to whatever conditions the wheel moves through. This is particularly problematic for vehicles that are intended to move through treacherous conditions or water.

In addition, when some or all of a power or brake assembly is located within the circumference of the wheel, the power or brake assembly may limit the maneuverability of the motorcycle since the wheel may be unable to rotate 360 degrees without entangling the engine's powertrain, electric motor wires, brake cabling, etc. This is particularly problematic for vehicles intended to perform highly maneuverable functions, such as autonomous motorcycles or other two-wheeled robots.

Additionally, human drivers and robotic encoders often have difficulty balancing motorcycles, especially when the vehicle is moving slowly or is stopped. Difficulties associated with balancing motorcycles may become a particular concern for autonomous or driverless motorcycles.

As such, the instant disclosure identifies and addresses a need for improved powered or driven wheels and balancing controls for motorcycles that make use of the same.

SUMMARY

As will be described in greater detail below, the instant disclosure describes a vehicular assembly, self-balancing robotic motorcycle, and method for assembling the same. In some embodiments, the robotic motorcycle may include a chassis, fore and aft driven wheel assemblies, and a control loop stabilizer. The fore and aft driven wheel assemblies may be mounted proximate to the fore and aft ends of the chassis, respectively. Each driven wheel assembly may include a wheel, a drive shaft, a steer shaft, and a bevel gear. The wheel may be mounted to an axle for rotation about a drive axis and steering about a substantially vertical steering axis. The drive shaft may extend along the steering axis from a first drive shaft end to a second drive shaft end. The second drive shaft end may be connected to a drive assembly that controls rotation of the drive shaft about the steering axis. The steer shaft may extend along the steering axis from a first steer shaft end to a second steer shaft end. The first steer shaft end may be connected to the axle and the second steer shaft end may be connected to a steer assembly that controls rotation of the steer shaft about the steering axis to steer the wheel about the steering axis. The bevel gear may connect the first drive shaft end to the axle such that rotation of the drive shaft about the steering axis controls rotation of the wheel about the drive axis to drive the robotic motorcycle in a substantially horizontal direction. The control loop stabilizer may be configured to balance the robotic motorcycle.

In one example, the control loop stabilizer may include sensors for detecting balancing input. The balancing input may include information indicative of the linear velocity and angular velocity of the robotic motorcycle, the linear velocity and angular velocity of each wheel, and/or the orientation of each wheel. The control loop stabilizer may also include a controller communicatively coupled to the sensors, drive assemblies, and/or steer assemblies. The controller may be configured to receive the balancing input from the sensors and, based on the same, determine drive and steer parameters for the drive and steer assemblies, respectively, to balance the robotic motorcycle. The controller may also be configured to cause the drive and steer assemblies to operate according to the determined drive and steer parameters. The control loop stabilizer may also include a gyroscope.

In some embodiments, each driven wheel assembly also includes a brake that is connected to the second drive shaft end and configured to retard motion of the drive shaft to thereby retard motion of the wheel. The brake may, in some examples, represent a disc brake. The disc brake may include a disc arranged on the second shaft end and configured to rotate with the drive shaft about the steering axis and a pair of pads on top and bottom sides of the disc. The controller may be configured to cause the pads to compress against the top and bottom sides of the disc to retard rotation of the disc and thereby retard rotation of the drive shaft. In some embodiments, each wheel may freely rotate 360 degrees around its steering axis.

In some embodiments, the chassis may include a base, a fore platform coupled to a fore end of the base, and an aft platform coupled to an aft end of the base. The fore driven wheel assembly may be mounted on the fore platform and the aft driven wheel assembly may be mounted on the aft platform. In some examples, the self-balancing robotic motorcycle may further include a suspension system. The suspension system may include a fore suspension mechanism for controlling the suspension of the fore platform relative to the base and an aft suspension mechanism for controlling the suspension of the aft platform relative to the base.

In some embodiments, for each wheel assembly, the drive axis and the steering axis may together form an oblique angle such that the wheel is tilted relative to the steering axis and the wheel is steerable about the steering axis at a single point of rotation. In some embodiments, the second drive shaft end and/or the second steer shaft end may extend above the chassis. Similarly, the drive and/or steer assemblies may be mounted on top of the chassis. In addition, the drive shaft may be concentrically arranged inside of the steer shaft.

Similarly, a vehicular assembly may include a chassis that includes a fore end and an aft end and fore and aft driven wheel assemblies mounted proximate to the fore and aft ends of the chassis, respectively. Each of the driven wheel assemblies may include a wheel, a drive shaft, a steer shaft, and a bevel gear. The wheel may be mounted to an axle for rotation about a drive axis and steering about a substantially vertical steering axis. The drive shaft may extend along the steering axis from a first drive shaft end to a second drive shaft end. The second drive shaft end may be connected to a drive assembly that controls rotation of the drive shaft about the steering axis. The steer shaft may extend along the steering axis from a first steer shaft end to a second steer shaft end. The first steer shaft end may be connected to the axle and the second steer shaft end may be connected to a steer assembly that controls rotation of the steer shaft about the steering axis to steer the wheel about the steering axis. The bevel gear may connect the first drive shaft end to the axle such that rotation of the drive shaft about the steering axis controls rotation of the wheel about the drive axis to drive the vehicular platform in a substantially horizontal direction.

In addition, a method for assembling a vehicular platform may include (1) mounting fore and aft driven wheel assemblies to fore and aft ends, respectively, of a chassis and (2) communicatively coupling, to the vehicular platform, a control loop stabilizer configured balance the vehicular platform. Each of the driven wheel assemblies may include a wheel, a drive shaft, a steer shaft, and a bevel gear. The wheel may be mounted to an axle for rotation about a drive axis and steering about a substantially vertical steering axis. The drive shaft may extend along the steering axis from a first drive shaft end to a second drive shaft end. The second drive shaft end may be connected to a drive assembly that controls rotation of the drive shaft about the steering axis. The steer shaft may extend along the steering axis from a first steer shaft end to a second steer shaft end. The first steer shaft end may be connected to the axle and the second steer shaft end may be connected to a steer assembly that controls rotation of the steer shaft about the steering axis to steer the wheel about the steering axis. The bevel gear may connect the first drive shaft end to the axle such that rotation of the drive shaft about the steering axis controls rotation of the wheel about the drive axis to drive the vehicular platform in a substantially horizontal direction.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
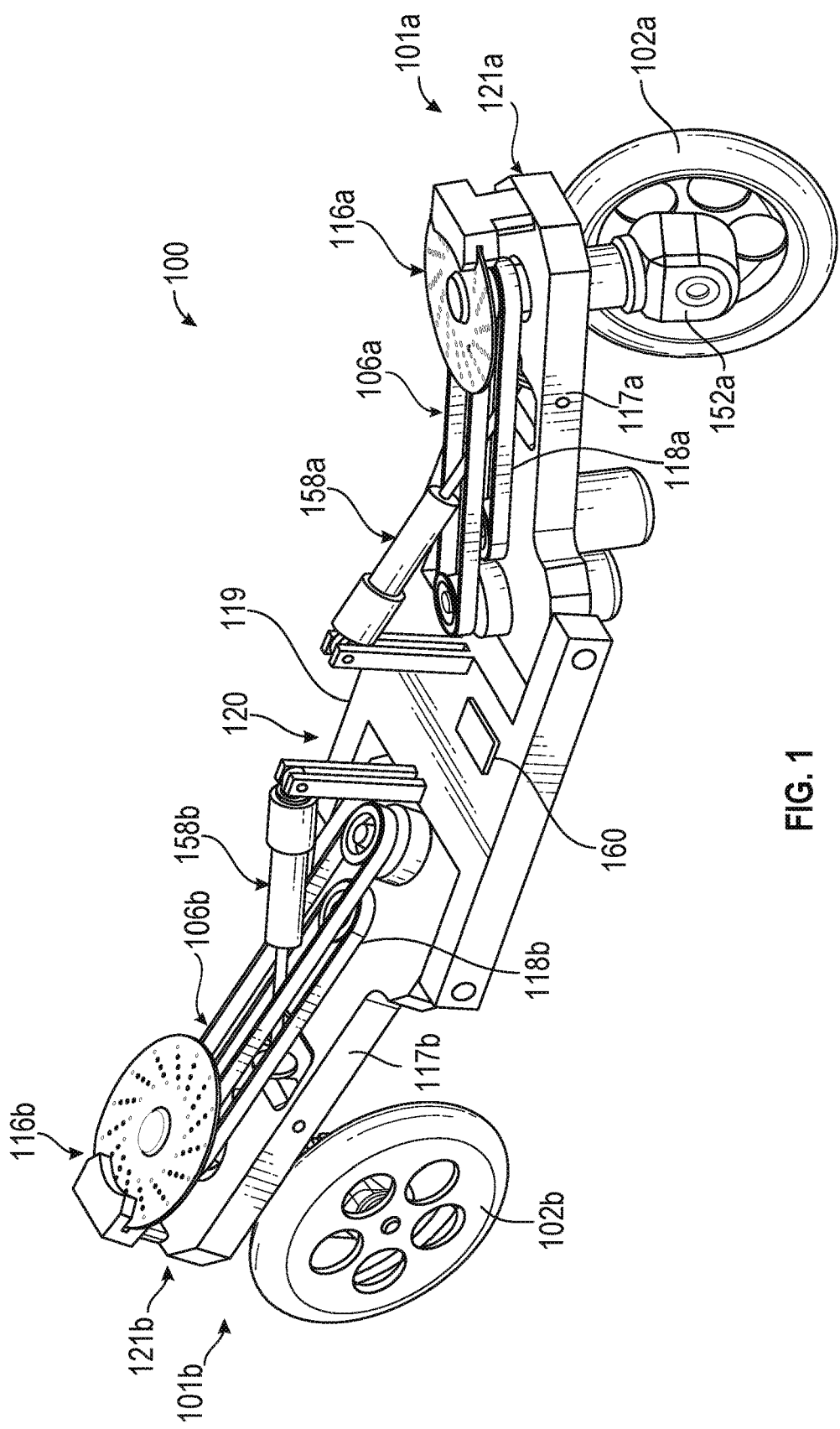
FIG. 1 is a left perspective view of a self-balancing robotic motorcycle, according to an embodiment.
Figure 2:
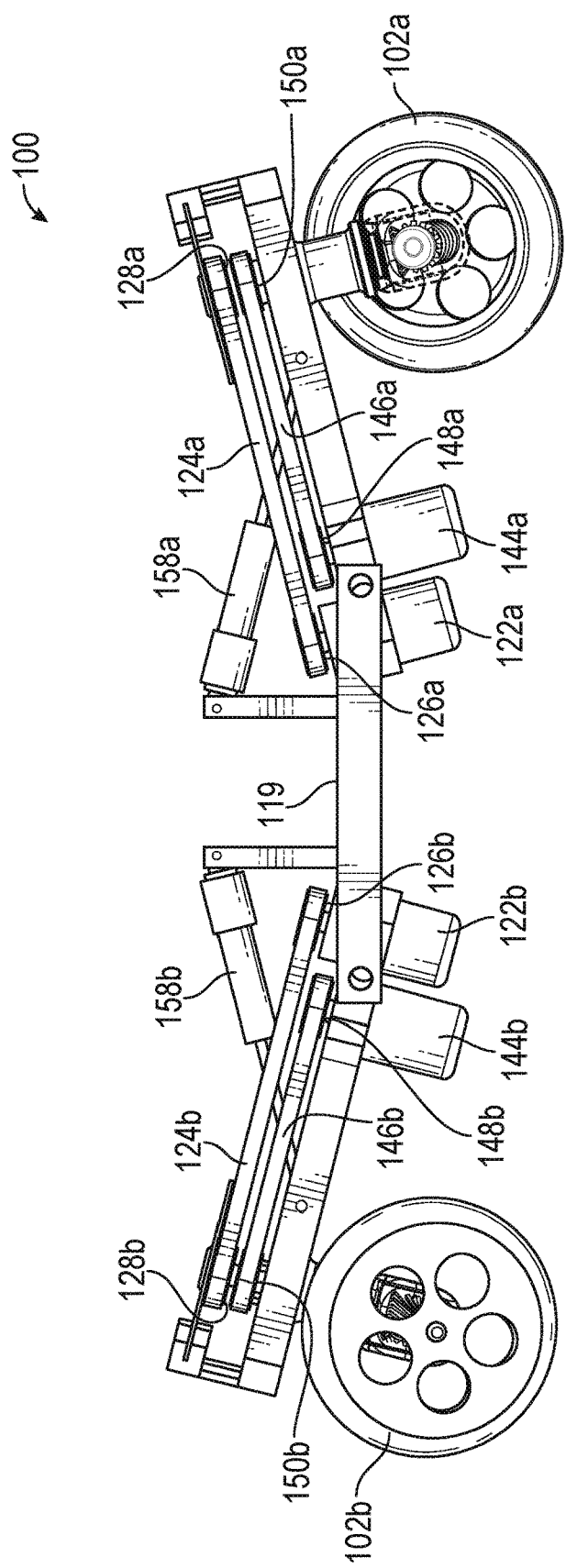
FIG. 2 is a left-side view of the self-balancing robotic motorcycle of FIG. 1.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to self-balancing robotic motorcycles, vehicular platforms designed to support robotic motorcycles, and methods for assembling the same. As will be explained in greater detail below, embodiments of the instant disclosure may include a vehicular platform that includes a chassis, driven wheel assemblies, and a control loop stabilizer. The driven wheel assemblies may each include a wheel and a bevel gear. The wheel may be mounted to an axle for rotation about a drive axis and steering about a substantially vertical steering axis. A steer shaft may connect the axle to a steer assembly that controls rotation of the steer shaft about the steering axis to steer the wheel. A drive shaft may have one end coupled to a drive assembly to control rotation of the shaft about the steering axis. The bevel gear may couple the other end of the drive shaft to the axle so that rotation of the drive shaft about the steering axis controls rotation of the wheel about the drive axis. The control loop stabilizer may determine parameters for the drive and steer assemblies to balance the vehicular platform. In addition, a suspension system may improve the steering capabilities and stability of the vehicular platform.

The devices, vehicles, and assemblies described herein may provide a number of features and advantages over traditional systems. For example, in some configurations, the entire power assemblies (e.g., drive and steer assemblies) of the driven wheels may be located distally from the wheels. As such, components of these power assemblies (e.g., electrical motors, combustion engines, wires, drivetrains, etc.) may be protected, for example, from environmental conditions that may surround the wheels. This may be particularly advantageous for vehicles intended to move through extreme weather conditions or through water. In addition, the configuration of the driven wheels may enable each wheel to freely rotate 360 degrees about its steering axis without becoming entangled by electrical wires, the drivetrain, or other components of the drive assembly. This may enable a vehicle to accomplish a variety of steering feats, such as moving linearly in a sideways direction. The driven wheels may also include a brake assembly that is disposed distally from the wheel (e.g., entirely above the chassis), which may similarly protect the brake assembly from impact and environmental damage. Furthermore, a control loop stabilizer system may help balance the vehicle.

The following will provide, with reference to FIGS. 1-6, detailed descriptions of self-balancing robotic motorcycles and vehicular platforms that may support such vehicles. FIG. 1 is a left, perspective view of a vehicular platform 100 according to one embodiment. The vehicular platform 100 may include a chassis 120 having a fore end 121a and an aft end 121b. A fore drive assembly 106a may be mounted proximate the fore end 121a of the chassis 120 and an aft drive assembly 106b may be mounted proximate the aft end 121b of the chassis 120. Fore and aft driven wheel assemblies 101a, 101b may be mounted proximate the fore and aft ends 121a, 121b of the chassis 120, respectively. The term "drive assembly" may, in some examples, refer to any mechanism capable of generating torque sufficient to drive a wheel. Examples of drive assemblies include, without limitation, combustion engines, electric motors, and the like. In one example, the drive assemblies 106a, 106b may each include a drive motor 122a, 122b (as referenced in FIGS. 2 and 5) and, in some examples, a drivetrain (e.g., a chain, belt, etc.), such as the drive belts 124a, 124b (as referenced in FIGS. 2 and 5) controlled by the drive motor 122a, 122b. Although not illustrated, drive assemblies 106a, 106b may also include a variety of additional components, such as batteries, encoders, etc.

While FIGS. 1-6 show and describe a vehicular platform with two driven wheel assemblies 101a, 101b, any suitable number of driven wheel assemblies 101a, 101b may be provided while remaining within the scope of this disclosure. Furthermore, while the following description at times refers to only one of the wheel assemblies (e.g., the fore wheel assembly 101a), it should be understood that the description of a single wheel assembly may also apply to some or all of the other wheel assemblies (e.g., the aft driven wheel assembly 101b). A more detailed description and discussion of the driven wheel assemblies described herein may be found in U.S. patent application Ser. No. 15/828,349, titled "DRIVEN CASTER WHEEL AND ASSEMBLY," filed on 30 Nov. 2017, the entirety of which is incorporated herein by reference.

Figure 3:
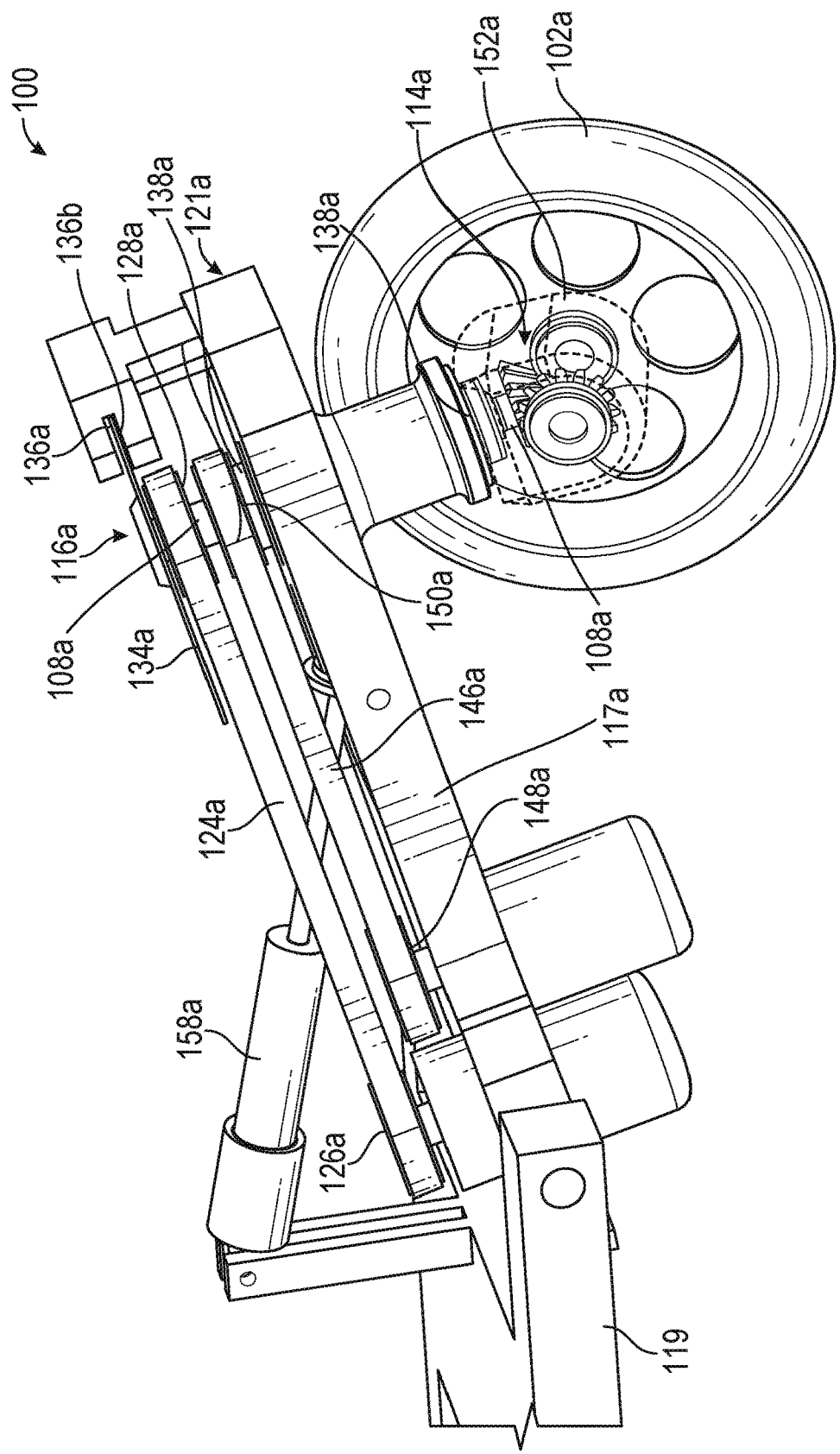
FIG. 3 is a blown-up, left-side view of the self-balancing robotic motorcycle of FIG. 1.
Figure 4:
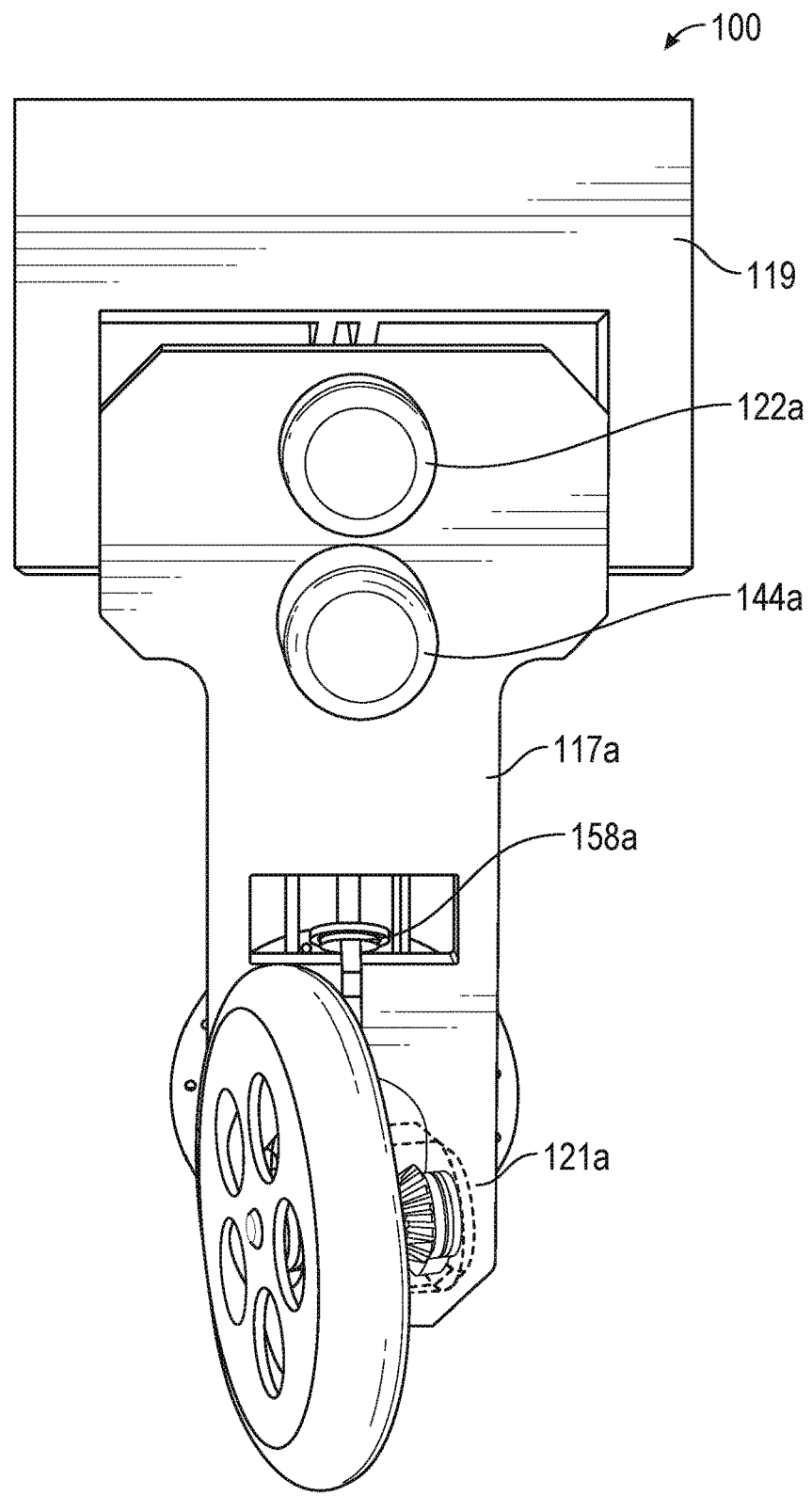
FIG. 4 is a blown-up, bottom view of the self-balancing robotic motorcycle of FIG. 1.
Figure 6:
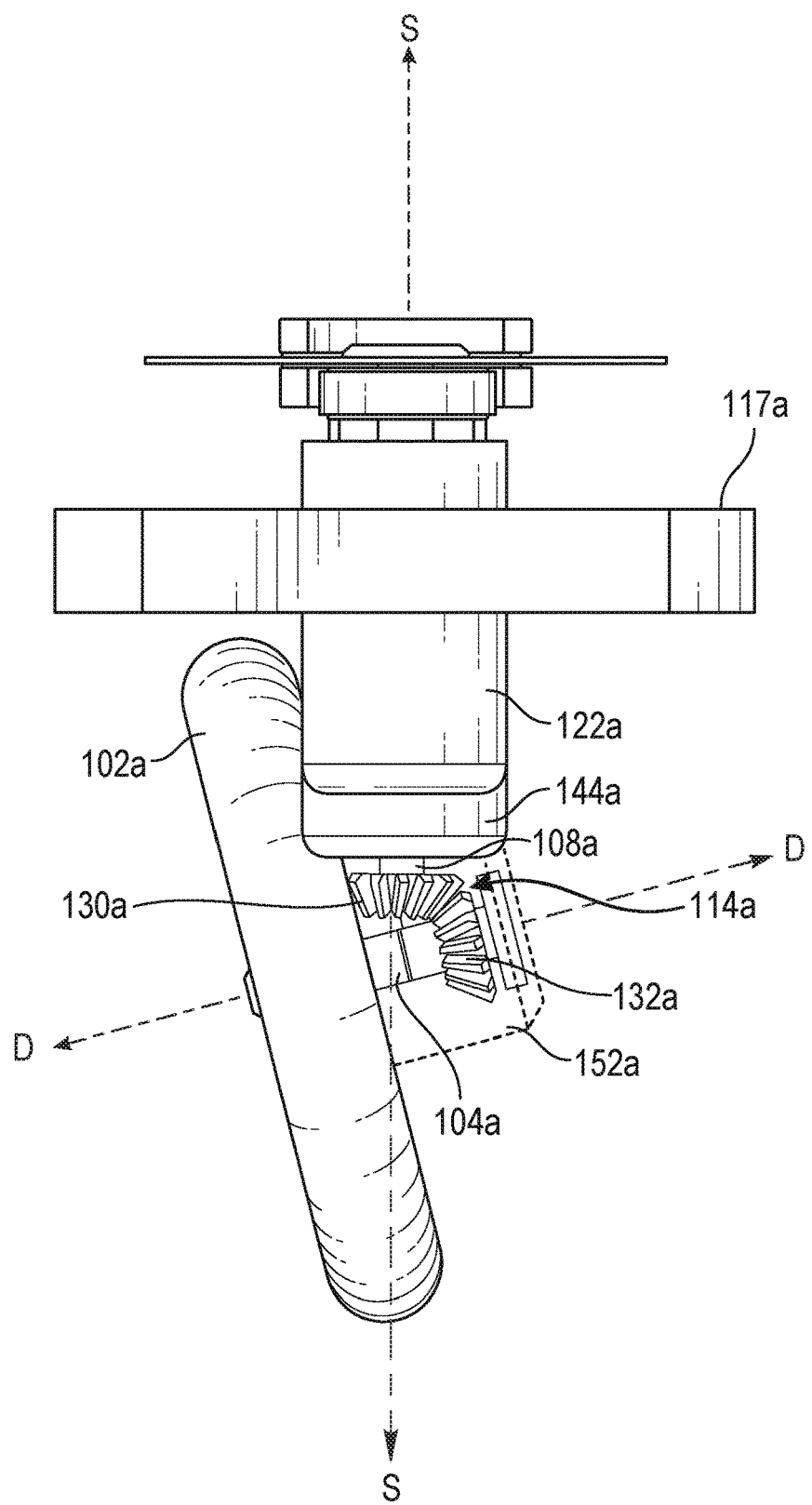
FIG. 6 is a rear view of a portion of the self-balancing robotic motorcycle of FIG. 1.

With reference to FIGS. 1, 3, and 6, the fore wheel assembly 101a may include a wheel 102a mounted to an axle 104a, a drive shaft 108a, and a bevel gear 114a. The wheel 102a may be mounted to axle 104a for rotation about a drive axis D. In this example, the rotation of the wheel 102a about the drive axis D may be controlled by a drive assembly 106a, as shown in FIG. 1, that is located distally from the wheel 102a and on the chassis 120. The drive shaft 108a may extend substantially vertically from the drive assembly 106a to the axle 104a and rotate about a substantially vertically steering axis S. The bevel gear 114a may connect the drive shaft 108a to the axle 104a to translate torque and power from the drive assembly 106a to the wheel 102a.

As shown in FIGS. 1-3 and 5, the entire fore drive assembly 106a may be located distally from the wheel 102a, and the drive pulleys 126a, 128a and the drive belt 124a may be disposed on top of the chassis 120, which may protect the vehicular platform from damage. For example, by positioning the drive assembly's electrical components distally from the wheel, the vehicular platform 100 may be able to drive through deep water or survive other environmental conditions.

The drive assemblies 106a, 106b may each include a respective drive motor (e.g., drive motors 122a, 122b) and a respective drivetrain (e.g., drive belts 124a, 124b) that rotates about a drive motor pulley (drive pulleys 126a, 126b) and a drive pulley (e.g., drive pulleys 128a, 128b). The power of the driven wheel assemblies (e.g., driven wheel assembly 101a) may be controlled by the drive pulleys (e.g., drive pulley 128a) mounted to or integral with the drive shafts (e.g., drive shaft 108a). In other examples, the drive assemblies may be mounted directly to the drive shafts, which may eliminate the need for the drive pulleys and/or the drive belts.

Figure 5:
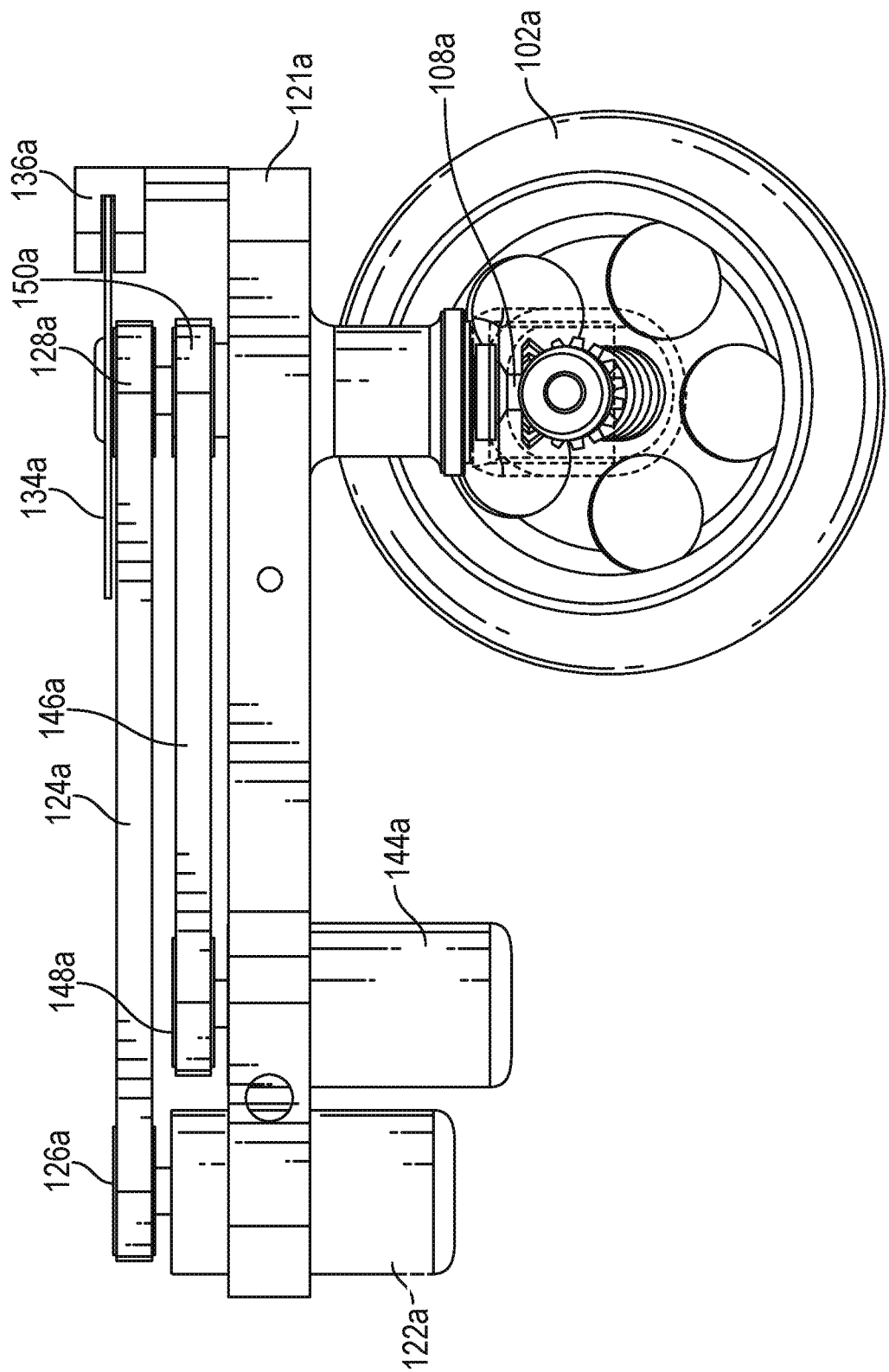
FIG. 5 is a blown-up, left-side view of the self-balancing robotic motorcycle of FIG. 1.

As shown in FIGS. 3, 5 and 6, in some embodiments, the drive motor 122a may rotate about a substantially vertical drive axis D that extends substantially parallel to the steering axis S. Drive pulley 126a may be mounted to the upper portion of the drive motor 122a, and a respective drive pulley 128a may be mounted to an upper portion of the drive shaft 108a. The drive belt 124a may extend between the drive pulleys 126a, 128a and within a plane substantially perpendicular to the drive axis D and steering axis S. Thus, the drive motor 122a may cause the drive motor pulley 126a to move about the drive axis D, which may in turn cause the drive belt 124a to move about the drive pulleys 126a, 128a, thereby causing the drive pulley 128a and the drive shaft 108a to rotate about their steering axis S. As will be explained in greater detail below, the drive motors 122a, 122b may be controlled independently of one another to facilitate steering and balancing of the vehicle.

Referring to FIGS. 3, 5, and 6, the torque and power from the drive motor 122a may be transferred from the drive shaft 108a to the axle 104a via the bevel gear 114a. The drive shaft 108a and axle 104a may function as the shafts of the bevel gear 114a. Mating gears 130a, 132a may be disposed on the lower portion of the drive shaft 108a and axle 104a. Thus, the bevel gear 114a may transfer and change the direction of the power and torque from the drive shaft 108a to the wheel 102a. As shown in FIG. 5, the bevel gear 114a may represent a miter gear and the mating gears 130a, 132a may provide a gear ratio of 1:1. The bevel gear 114a can, however, have other suitable configurations and gear ratios while remaining within the scope of this disclosure. For example, the mating gears 130a, 132a may include any suitable number of teeth. Also, the intersection of the drive and steering axes can form any suitable angle while remaining within the scope of this disclosure.

As described herein, drive power may be provided to the wheel 102a by way of the substantially vertical drive shaft 108a that extends along only one side of the wheel 102a from the axle 104a to a location entirely above the wheel (e.g., above chassis 120). As such, the wheel 102a may be able to freely rotate 360 degrees about the steering axis S. This configuration may offer many advantages from a steering and maneuverability standpoint. For example, the configuration of the drive shaft 108a and the bevel gear 114a may result in a vehicular platform 100 that may be free of wires or other electrical components extending close to (or within the circumference of) the wheels 102a, 102b. In addition, since the drive shaft 108a receives power at its upper end, and transfers power to the wheel 102a at its lower end via the bevel gear 114a, the drive assembly 106a (including drive belt 124a) may be located entirely above the wheel 102a, with all electrical components disposed distally from the wheel 102a, leaving a simple gearing configuration proximate the wheel 102a.

In some embodiments, a set of brakes 116a, 116b may be disposed entirely above the wheels 102a, 102b. The brakes 116a and 116b may each be disposed on respective upper drive shaft ends and configured to retard motion of its respective drive shaft about their steering axis, thereby retarding motion of its respective wheel 102a, 102b about their drive axis. Any suitable brake configuration may be used. In one example, the brake 116a may represent a disc brake, including a disc 134a arranged on the upper drive shaft end and configured to rotate about the steering axis along with the drive shaft 108a. As shown in FIG. 3, the disc 134a may be mounted to the upper drive shaft end by being mounted to the drive pulley 128a. The disc 134a may have top and bottom surfaces, with each extending in a horizontal plane that is substantially perpendicular to the steering axis. A retarding mechanism may be provided to retard motion of the disc 134a. Any suitable type of retarding mechanism may be provided. In the embodiment herein described, the retarding mechanism includes top and bottom pads 136a, 136b disposed proximate the top and bottom surfaces of the disc 134a, respectively. At least one of the pads 136a, 136b may be compressible towards the disc 134*a* such that the pads 136*a*, 136*b* pinch the disc 134*a* to thereby retard its motion about the steering axis.

In the embodiment shown and herein described, a steer assembly 118*a*, 118*b* may be provided to control the steering of the wheels 102*a*, 102*b* about the steering axis S. The term "steer assembly" may, in some examples, refer to any mechanism capable of generating torque sufficient to steer a wheel. Examples of steer assemblies include, without limitation, combustion engines, electric motors, and the like. As with the drive assemblies described herein, the steer assemblies 118*a*, 118*b* may include a variety of additional components, including batteries, encoders, etc.

For each driven wheel assembly 101*a*, 101*b*, a steer shaft (e.g., steer shaft 138*a*) may extend along the steering axis from a bottom steer shaft end to a top steer shaft end. The bottom steer shaft end may be connected to the axle 104*a*, and the top steer shaft end may be coupled to the steer assembly 118*a*, such that the steer assembly 118*a* controls rotation of the steer shaft 138*a* about the steering axis S, which in turn steers the wheel 102*a* about the steering axis. Referring to FIG. 6, the bottom steer shaft end may be mounted to the axle 104*a* via a casting such that the axle 104*a* rotates about the steering axis along with the steer shaft 138*a*, thus causing the wheel 102*a* to rotate about the steering axis. As described in further detail below, the wheel 102*a* may be tilted with respect to the steering axis.

In one example, the steer assemblies 118*a*, 118*b* may include a respective steer motor (e.g., steer motors 144*a*, 144*b*), steer belt (e.g., steer belts 146*a*, 146*b*), steer pulley (e.g., steer pulleys 150*a*, 150*b*, 148*a*, 148*b*), the operation of which may be similar to that of the drive assemblies 106*a*, 106*b*. The steer motors 144*a*, 144*b* and steer belts 146*a*, 146*b* may control the steer shafts of driven wheel assemblies 101*a*, 101*b* independent of one another. The steer motors 144*a*, 144*b* may extend substantially vertically, proximate respective drive motors 122*a*, 122*b* on the chassis 120. The steer belts 146*a*, 146*b* and steer pulleys 150*a*, 150*b*, 148*a*, 148*b*, may rotate within a plane that is substantially parallel to and below the plane in which the drive motors 122*a*, 122*b*, drive belts 124*a*, 124*b*, and drive pulleys 126*a*, 126*b*, 128*a*, 128*b* rotate. The steer pulley 148*a* that is arranged on the steer shaft 138*a* may be disposed beneath the drive pulley 128*a* that is arranged on the drive shaft 108*a*. In other examples, the steer assemblies may be mounted directly to their respective steer shafts, which may eliminate the need for steer pulleys and/or steer belts.

In some embodiments, and as shown in FIGS. 3 and 6, the steer shaft 138*a* may be arranged concentrically with respect to the drive shaft 108*a*. More particularly, the steer shaft 138*a* and drive shaft 108*a* may each extend along the steering axis, with the drive shaft 108*a* being disposed within the steer shaft 138*a*. As such, the drive shaft 108*a* may be connected to the axle 104*a* via the bevel gear 114*a*, and the steer shaft 138*a* may be mounted to the axle 104*a* via a casting 152*a* that is disposed around the bevel gear 114*a*. A more detailed description and discussion of this concentric arrangement may be found in U.S. patent application Ser. No. 15/828,349, titled "DRIVEN CASTER WHEEL AND ASSEMBLY," filed on 30 Nov. 2017, the entirety of which is incorporated herein by reference.

As shown in FIG. 6, in some embodiments, the bevel gear 114*a* may be configured so that the wheel 102*a* is tilted with respect to the steering axis. This tilt may reduce scrubbing action when the wheel turns, and thus improve the wheel's durability and steering capabilities. As shown in FIG. 6, the wheel's axis may extend along the length of the wheel, perpendicular to the drive axis D. In this example, the wheel's axis does not extend parallel to the steering axis S, but rather is tilted at an angle relative thereto. As such, while the drive shaft and steering axis extend in a substantially vertical direction, the axle and drive axis may extend in a direction that is not horizontal. In other words, the bevel gear 114*a* may be configured such that the steering axis S and drive axis D form an angle that is oblique. In some examples, the wheel 102*a* is tilted at an angle so that when the vehicular platform 100 is on a surface, the wheel 102*a* rotates about the steering axis S at a point that is its center of mass. For example, for a wheel and tire configuration having a diameter substantially equal to 16 inches, the bevel gear 114*a* may be configured so that the angle between the drive axis D and steering axis S is about 110 degrees and the angle between the steering axis S and the wheel is equal to about 20 degrees.

As shown in FIGS. 1-6, the entire chassis 120 may be arranged above the wheels 102*a*, 102*b*, and the drive and steer shafts (e.g., drive shaft 108*a* and steer shaft 138*a*) may extend from their respective axle (e.g., axle 104*a*), through the surface of chassis 120, to a location at or above a top surface of the chassis 120. In addition, the drive and steer belts 124*a*, 124*b*, 146*a*, 146*b* and pulleys 126*a*, 126*b*, 128*a*, 128*b*, 150*a*, 150*b*, 148*a*, 148*b*, may be located at or above the top surface of the chassis 120. Also, the drive and steer motors 122*a*, 122*b*, 144*a*, 144*b* may be located distally from the wheels 102*a*, 102*b*. Thus, with the chassis disposed between the wheel and the drive and steer belts and pulleys, and the drive and steer motors 122*a*, 122*b*, 144*a*, 144*b* located distally from the wheels 102*a*, 102*b*, the drive and steer assemblies may be protected from environmental conditions that may surround the wheel.

As shown in FIG. 1, in some embodiments, the chassis 120 may include a base 119, a fore platform 117*a* connected to a fore end of the base 119, and an aft platform 117*b* connected to an aft end of the base 119. The fore drive assembly 106*a*, fore steer assembly 118*a*, and fore wheel assembly 101*a* may be arranged on the fore platform 117*a*, and the aft drive assembly 106*b*, aft steer assembly 118*b*, and aft driven wheel assembly 101*b* may be arranged on the aft platform 117*b*. The vehicular platform 100 may include fore and aft suspension systems 158*a*, 158*b* for controlling the suspension of the fore and aft platforms 117*a*, 117*b* relative to the base 119.

In some embodiments, vehicular platform 100 may include a control loop stabilizer system 160 that is configured to balance the vehicular platform 100. This control loop stabilizer system 160 may, in some examples, include sensors for detecting balancing input. Balancing input may include any type or form of information helpful or necessary to balance a vehicle, including information indicative of linear and angular velocity of the vehicular platform 100, the linear and angular velocity of each of the wheels 102*a*, 102*b*, and/or the orientation of each of the wheels 102*a*, 102*b*, among other information. The control loop stabilizer system 160 may further include a controller that is communicatively coupled to the sensors, the drive motors 122*a*, 122*b*, and the steer motors 144*a*, 144*b*. The controller may be configured to receive the balancing input from the sensors, and based on the balancing input, determine drive and steer parameters for the drive motors 122*a*, 122*b* and the steer motors 144*a*, 144*b* to balance the vehicular platform 100. The controller may also be configured to cause the drive motors 122*a*, 122*b* and steer motors 144*a*, 144*b* to operate according to the determined drive and steer parameters, respectively. In some embodiments, the control loop stabilizer system 160 may include a gyroscope.

In some embodiments, the drive belt 124a may be wrapped directly to the circumference of the drive motor 122a or the drive shaft 108a without a separate pulley component (e.g., the bottom portion of the drive motor 122a and/or the top portion of the drive shaft 108a may function as a pulley).

Figure 7:
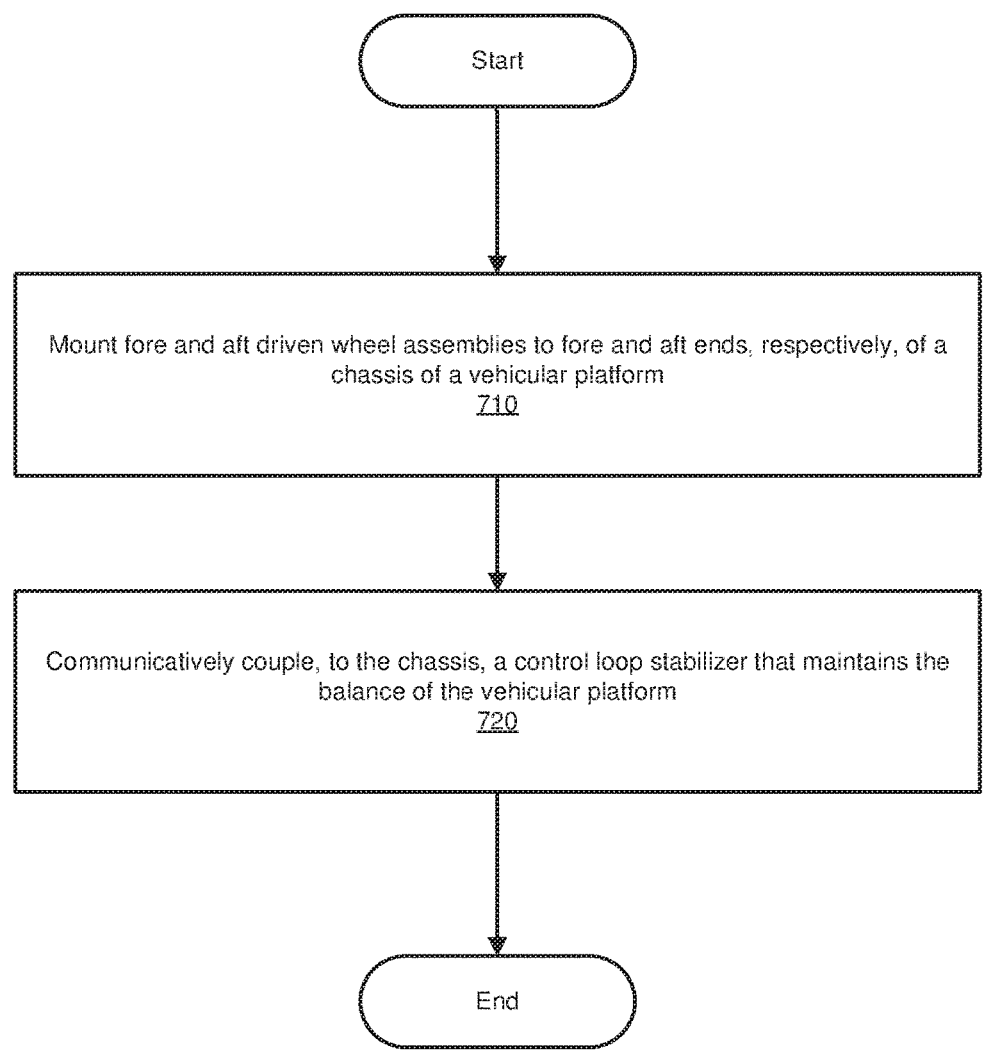
FIG. 7 is a method of assembling a self-balancing vehicle, according to an embodiment.

Referring now to FIG. 7, also disclosed herein is a method 700 of assembling a vehicular platform, such as the vehicular platform 100 described above with reference to FIGS. 1-6. In step 710, fore and aft driven wheel assemblies are mounted to fore and aft ends, respectively, of a chassis. For example, driven wheel assemblies 101a, 101b may be mounted to chassis 120. In step 720, a control loop stabilizer may be communicatively coupled to the vehicular platform. For example, control loop stabilizer system 160 may be communicatively coupled to the vehicular platform 100. As detailed above, this control loop stabilizer may be configured to determine parameters of the drive and steer assemblies of the vehicular platform 100 to balance the vehicular platform 100.

While fore end 121a is referred to herein as the fore end, and aft end 121b is referred to herein as the aft end, the disclosed vehicle may move in multiple directions such that the aft end, right side, and left side may also be located at the front of the vehicular platform 100. For example, the disclosed vehicular platform may be capable of moving in all directions on a substantially horizontal surface. In one instance, the wheels 102a, 102b may both turn about the steering axis 90 degrees, such that the right side of the vehicular platform 100 becomes the front of the vehicle as it moves horizontally across a surface. This may be particularly advantageous when navigating the vehicular platform 100 between objects or barriers. For example, in order to "parallel park" the vehicular platform 100 into a space between two objects, the vehicular platform may not need to maneuver forwards and backwards in a traditional manner. Rather, the vehicular platform 100 may be positioned beside and parallel to a space, turn the wheels 102a, 102b so that they are directed to the space (e.g., turn the wheels 102a, 102b 90 degrees), and then simply move linearly (e.g., in a sideways direction) into the space. Also, the vehicular platform 100 may move in a backward direction without using a reverse gear. Thus, the vehicular platform 100 may be capable of moving in a backward direction with just as much speed as it moves in a forward direction.

The term "wheel," in some examples, generally refers to any suitable type of disc or other object that is rotatable about an axis. Examples of wheels include, without limitation, a disc-shaped object that is configured to roll along a surface (e.g., caster wheels), a propeller capable of converting rotational movement to thrust (e.g., to drive a boat through the water), or any other type or form of rotatable object. The vehicular platform described herein can have a multitude of applications. For example, the vehicular platform may, when integrated within a motorcycle design, provide an improved (and potentially autonomous) form of transportation for humans. This vehicular platform may also be used to support a robot that that is configured to navigate through extreme environmental conditions, perform surgery in a hospital, manage a data center, etc.

As detailed above, the disclosed vehicular platform and self-balancing, robotic motorcycle may provide many advantages. For example, the motorcycle's power assembly (which may include both driving and steering assemblies) may be located entirely outside the circumference of its wheels, thus protecting the power assembly from forceful impacts as well as environmental conditions that may surround its wheels. Similar benefits may be achieved by disposing the motorcycle's brake assembly distally from its wheels. The robotic motorcycle disclosed herein may also be configured to allow its wheels to freely rotate 360 degrees about its steering axis without becoming entangled by electrical wires or other components of the drive assembly. The disclosed robotic motorcycle may also include a control loop stabilizer that autonomously balances the vehicle.

The methods and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:
1. A robotic motorcycle comprising:
a chassis that comprises a fore end and an aft end;
fore and aft driven wheel assemblies mounted proximate to the fore and aft ends of the chassis, respectively, each of the driven wheel assemblies comprising:
a wheel mounted to an axle for rotation about a drive axis and steering about a substantially vertical steering axis;
a drive shaft extending along the steering axis from a first drive shaft end to a second drive shaft end, the second drive shaft end being connected to a drive assembly that controls rotation of the drive shaft about the steering axis;
a steer shaft extending along the steering axis from a first steer shaft end to a second steer shaft end, the first steer shaft end being connected to the axle and the second steer shaft end being connected to a steer assembly that controls rotation of the steer shaft about the steering axis to steer the wheel about the steering axis; and
a bevel gear connecting the first drive shaft end to the axle such that rotation of the drive shaft about the steering axis controls rotation of the wheel about the drive axis to drive the robotic motorcycle in a substantially horizontal direction; and
a control loop stabilizer configured to balance the robotic motorcycle.

2. The robotic motorcycle of claim 1, wherein the control loop stabilizer comprises:
sensors for detecting balancing input, the balancing input comprising information indicative of at least one of:
a linear velocity of the robotic motorcycle;
an angular velocity of the robotic motorcycle;
a linear velocity of each wheel;
an angular velocity of each wheel; or
an orientation of each wheel; and
a controller communicatively coupled to at least one of:
the sensors;
each drive assembly; or
each steer assembly;
wherein the controller is configured to:
receive the balancing input from the sensors;
based on the balancing input, determine drive and steer parameters for each drive and steer assembly, respectively, to balance the robotic motorcycle; and
cause each drive and steer assembly to operate according to the determined drive and steer parameters, respectively.

3. The robotic motorcycle of claim 2, wherein the control loop stabilizer comprises a gyroscope.

4. The robotic motorcycle of claim 2, wherein each driven wheel assembly further comprises a brake that is connected to the second drive shaft end and configured to retard motion of the drive shaft to thereby retard motion of the wheel.

5. The robotic motorcycle of claim 4, wherein the brake comprises a disc brake that comprises:
a disc arranged on the second drive shaft end and configured to rotate with the drive shaft about the steering axis; and
a pair of pads on top and bottom sides of the disc, wherein the controller is configured to cause the pads to compress against the top and bottom sides of the disc to retard rotation of the disc and thereby retard rotation of the drive shaft.

6. The robotic motorcycle of claim 1, wherein, for each driven wheel assembly, the wheel is configured to freely rotate 360 degrees around the steering axis.

7. The robotic motorcycle of claim 1, wherein the chassis further comprises:
a base having a fore end and an aft end;
a fore platform connected to the fore end of the base; and
an aft platform connected to the aft end of the base;
wherein the fore driven wheel assembly is mounted on the fore platform and the aft driven wheel assembly is mounted on the aft platform.

8. The robotic motorcycle of claim 7, further comprising:
a suspension system that comprises a fore suspension mechanism for controlling suspension of the fore platform relative to the base; and
an aft suspension mechanism for controlling suspension of the aft platform relative to the base.

9. The robotic motorcycle of claim 1, wherein, for each driven wheel assembly, the drive axis and the steering axis together form an oblique angle such that the wheel is tilted relative to the steering axis and the wheel is steerable about the steering axis at a single point of rotation.

10. The robotic motorcycle of claim 1, wherein, for each driven wheel assembly:
the second drive shaft end extends above the chassis;
the second steer shaft end extends above the chassis;
the drive assembly is mounted on top of the chassis; or
the steer assembly is mounted on top of the chassis.

11. The robotic motorcycle of claim 1, wherein, for each driven wheel assembly, the drive shaft is concentrically arranged inside of the steer shaft.

12. A vehicular platform, comprising:
a chassis that comprises a fore end and an aft end; and
fore and aft driven wheel assemblies mounted proximate to the fore and aft ends of the chassis, respectively, each of the driven wheel assemblies comprising:
a wheel mounted to an axle for rotation about a drive axis and steering about a substantially vertical steering axis;
a drive shaft extending along the steering axis from a first drive shaft end to a second drive shaft end, the second drive shaft end being connected to a drive assembly that controls rotation of the drive shaft about the steering axis;
a steer shaft extending along the steering axis from a first steer shaft end to a second steer shaft end, the first steer shaft end being connected to the axle and the second steer shaft end being connected to a steer assembly that controls rotation of the steer shaft about the steering axis to steer the wheel about the steering axis; and
a bevel gear connecting the first drive shaft end to the axle such that rotation of the drive shaft about the steering axis controls rotation of the wheel about the drive axis to drive the vehicular platform in a substantially horizontal direction.

13. The vehicular platform of claim 12, wherein the chassis further comprises:
a base having a fore end and an aft end;
a fore platform connected to the fore end of the base; and
an aft platform connected to the aft end of the base;
wherein the fore driven wheel assembly is mounted on the fore platform and the aft driven wheel assembly is mounted on the aft platform.

14. The vehicular platform of claim 13, further comprising:
a suspension system that includes a fore suspension mechanism for controlling suspension of the fore platform relative to the base; and
an aft suspension mechanism for controlling suspension of the aft platform relative to the base.

15. The vehicular platform of claim 12, further comprising a control loop stabilizer that is configured to balance the vehicular platform.

16. The vehicular platform of claim 15, wherein the control loop stabilizer comprises:
sensors for detecting balancing input, the balancing input comprising information indicative of at least one of:
a linear velocity of the vehicular platform;
an angular velocity of the vehicular platform;
a linear velocity of each wheel;
an angular velocity of each wheel; or
an orientation of each wheel; and
a controller communicatively coupled to at least one of:
the sensors;
each drive assembly; or
each steer assembly;
wherein the controller is configured to:
receive the balancing input from the sensors;
based on the balancing input, determine drive and steer parameters for each drive and steer assembly, respectively, to balance the vehicular platform; and cause each drive and steer assembly to operate according to the determined drive and steer parameters, respectively.

17. The vehicular platform of claim 16, wherein each driven wheel assembly further comprises a disc brake that is connected to the second drive shaft end and configured to retard motion of the drive shaft to thereby retard motion of the wheel, the disc brake comprising:
   a disc arranged on the second drive shaft end and configured to rotate with the drive shaft about the steering axis; and
   a pair of pads on top and bottom sides of the disc, wherein the controller is configured to cause the pads to compress against the top and bottom sides of the disc to retard rotation of the disc and thereby retard rotation of the drive shaft.

18. The vehicular platform of claim 12, wherein, for each driven wheel assembly, the wheel is configured to freely rotate 360 degrees around the steering axis.

19. A method of assembling a vehicular platform, comprising:
   mounting fore and aft driven wheel assemblies to fore and aft ends, respectively, of a chassis, wherein assembling each of the driven wheel assemblies comprises:
      mounting a wheel to an axle for rotation about a drive axis and steering about a substantially vertical steering axis;
      extending a drive shaft along the steering axis from a first drive shaft end to a second drive shaft end, the second drive shaft end being connected to a drive assembly that controls rotation of the drive shaft about the steering axis;
      extending a steer shaft along the steering axis from a first steer shaft end to a second steer shaft end, the first steer shaft end being connected to the axle and the second steer shaft end being connected to a steer assembly that controls rotation of the steer shaft about the steering axis to steer the wheel about the steering axis; and
      connecting, via a bevel gear, the first drive shaft end to the axle such that rotation of the drive shaft about the steering axis controls rotation of the wheel about the drive axis to drive the vehicular platform in a substantially horizontal direction; and
   communicatively coupling, to the vehicular platform, a control loop stabilizer configured to balance the vehicular platform.

20. The method of claim 19, wherein the control loop stabilizer comprises:
   sensors for detecting balancing input, the balancing input comprising information indicative of at least one of:
      a linear velocity of the vehicular platform;
      an angular velocity of the vehicular platform;
      a linear velocity of each wheel;
      an angular velocity of each wheel; or
      an orientation of each wheel; and
   a controller communicatively coupled to at least one of:
      the sensors;
      each drive assembly; or
      each steer assembly;
   wherein the controller is configured to:
      receive the balancing input from the sensors;
      based on the balancing input, determine drive and steer parameters for each drive and steer assembly, respectively, to balance the vehicular platform; and
      cause each drive and steer assembly to operate according to the determined drive and steer parameters, respectively.

\* \* \* \* \*